US012372220B2

(12) United States Patent
He et al.

(10) Patent No.: US 12,372,220 B2
(45) Date of Patent: Jul. 29, 2025

(54) CABINET LIGHT WITH DIFFUSER AND REFLECTOR BEHIND L-SHAPED LAMP SHADE

(71) Applicant: CR LIGHTING TECHNOLOGY CO., LTD., Shenzhen (CN)

(72) Inventors: Yansheng He, Shenzhen (CN); Jiancong Mai, Shenzhen (CN)

(73) Assignee: CR LIGHTING TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/022,373

(22) Filed: Jan. 15, 2025

(65) Prior Publication Data

US 2025/0155106 A1 May 15, 2025

(51) Int. Cl.

| | |
|---|---|
| ***F21V 13/04*** | (2006.01) |
| ***F21V 3/04*** | (2018.01) |
| ***F21V 23/02*** | (2006.01) |
| ***F21V 23/04*** | (2006.01) |
| ***F21V 23/06*** | (2006.01) |
| ***H05B 45/325*** | (2020.01) |
| ***H05B 47/195*** | (2020.01) |
| *F21W 131/301* | (2006.01) |
| *F21Y 115/10* | (2016.01) |

(52) U.S. Cl.

CPC .............. *F21V 13/04* (2013.01); *F21V 3/049* (2013.01); *F21V 23/023* (2013.01); *F21V 23/0442* (2013.01); *F21V 23/06* (2013.01); *H05B 45/325* (2020.01); *H05B 47/195* (2020.01); *F21W 2131/301* (2013.01); *F21Y 2115/10* (2016.08)

(58) Field of Classification Search

CPC ........ F21V 13/04; F21V 23/023; F21V 23/06; F21V 21/005; F21V 23/0471; F21V 15/01; F21V 15/015; F21V 3/049; F21W 2131/301

See application file for complete search history.

(56) References Cited

U.S. PATENT DOCUMENTS 5,743,627 A * 4/1998 Casteel .................. F21V 15/00 362/225
6,390,652 B1 * 5/2002 Echito ...................... F21S 8/00 362/374
6,536,924 B2 * 3/2003 Segretto ................ F21V 21/005 362/345
7,384,170 B2 * 6/2008 Skegin ...................... F21S 4/28 362/240
7,815,332 B1 * 10/2010 Smith ..................... F21V 23/06 362/147
8,215,795 B2 * 7/2012 Pichel ................ F21V 33/0012 362/249.02
9,435,498 B1 * 9/2016 Anderson ............ F21V 21/025

(Continued)

*Primary Examiner* — Ismael Negron
(74) *Attorney, Agent, or Firm* — Murray, Ziel & Johnston; Aaron Powell

(57) ABSTRACT

A cabinet light includes a housing, a luminous unit arranged inside the cover, and an L-shaped lamp shade connected to the housing. The lamp shade is configured as an L-shape structure. Light emitting elements of the luminous unit are arranged to project light towards the inner side of the lamp shade. A diffusion plate and a reflection plate are obliquely arranged between the lamp shade and the luminous unit. A pulse width modulation rotary switch and a passive infrared sensor might be used to control the luminous unit.

10 Claims, 5 Drawing Sheets

(56) References Cited

U.S. PATENT DOCUMENTS

| | | | | |
|---|---|---|---|---|
| 9,453,621 | B2 * | 9/2016 | Ohno | F21V 21/005 |
| 10,168,026 | B1 * | 1/2019 | Tickner | F21V 23/06 |
| 10,184,648 | B2 * | 1/2019 | Hall | F21V 23/002 |
| 10,353,142 | B2 * | 7/2019 | Conrad | G02B 6/0088 |
| 10,663,152 | B2 * | 5/2020 | Sperling | F21V 21/30 |
| 10,738,971 | B2 * | 8/2020 | Van Winkle | F21V 3/04 |
| 10,788,176 | B2 * | 9/2020 | Medendorp, Jr. | F21V 21/02 |
| 11,002,432 | B2 * | 5/2021 | Chen | F21V 23/003 |
| 2007/0127244 | A1 * | 6/2007 | Cunius | F21V 17/107<br>362/260 |
| 2007/0177392 | A1 * | 8/2007 | Grigorik | F21V 11/00<br>362/382 |
| 2011/0164407 | A1 * | 7/2011 | Stack | A47F 3/001<br>362/217.05 |
| 2017/0122510 | A1 * | 5/2017 | Tanifuji | F21V 3/02 |
| 2019/0154241 | A1 * | 5/2019 | Danville | F21V 23/008 |
| 2020/0072456 | A1 * | 3/2020 | Vasquez | F21S 2/00 |
| 2020/0400297 | A1 * | 12/2020 | Hou | F21K 9/61 |
| 2021/0330836 | A1 * | 10/2021 | Lane | F21S 4/28 |
| 2024/0102632 | A1 * | 3/2024 | Dong | F21V 7/005 |

* cited by examiner

CABINET LIGHT WITH DIFFUSER AND REFLECTOR BEHIND L-SHAPED LAMP SHADE

TECHNICAL FIELD

The present invention belongs to the technical field of lights, and particularly relates to a cabinet light with diffuser and reflector behind L-shaped lamp shade.

TECHNICAL BACKGROUND

Cabinets are essential kitchen furniture for modern families. Generally, it is necessary to provide more storage space in the kitchen. Therefore, the cabinets must be closely arranged in the kitchen and have a certain depth and height. When users want to take things from a kitchen cabinet, sometimes it is too dark to figure out simply just relying on the lighting from outside of the cabinet. Thus, it is necessary to install a separate cabinet light inside the cabinet. Yet, users face many obstacles and troubles when they install cabinet lights inside the cabinet.

At present, the layout of cabinet lights on the emitting surface are usually designed as an edge type. The edge type surface illuminating cabinet lights has an advantage that it can be manufactured in a thin shape with a generally uniform illuminance, so as to be installed in any limited space like inside the cabinet. However, The edge type surface illuminating cabinet lights requires other related parts including a light guide plate for guiding emitted light to the emitting surface, moreover, the light conversion efficiency of the edge type surface illuminating cabinet lights is low and the illuminance at the edge is relatively higher than the center of the emitting surface. As a result, it fails to meet users' needs to bright the inner environment of the cabinet.

INVENTION CONTENT

In order to overcome the defects of the existing technology, the present invention provides a cabinet light with diffuser and reflector behind L-shaped lamp shade, which has improved illumination uniformity and light conversion efficiency to meet users' needs.

The technical scheme adopted by the invention for solving the technical problems is as follows:

A cabinet light with diffuser and reflector behind L-shaped lamp shade includes a housing, a luminous unit arranged inside the housing and a lamp shade connected to the housing. The lamp shade is configured as an L-shape structure. The luminous portion of the luminous unit is arranged toward the inner side of the lamp shade. A diffusion plate and a reflection plate are arranged between the lamp shade and the luminous unit.

Further, the diffusion plate is obliquely arranged on the upper side of the luminous unit, and the reflection plate is obliquely arranged on the lower side of the luminous unit. One end of the diffusion plate away from the luminous unit is overlapped on the reflection plate. The diffusion plate and the reflection plate enclose to form a light refraction region.

Further, the outer surface of the lamp shade has a plurality of convex prismatic elements.

Further, the housing includes a first bottom wall, and a first side wall and a second side wall extending upward from two sides of the first bottom wall. The first bottom wall and the first side wall and the second side wall enclose to form a first placement cavity. The reflection plate and the diffusion plate are arranged in the first placement cavity.

Further, a first slot is arranged on the first bottom wall, a second slot is arranged on the first side wall. Two ends of the reflection plate are respectively inserted into the first slot and the second slot. A step is arranged on a top side of the second side wall. One end of the diffusion plate is overlapped on the end of the reflection plate close to one end of the second slot, and other end of the diffusion plate is overlapped on the step.

Further, a third slot is arranged on a side of the first side wall away from the second slot, a fourth slot is arranged on the top side of the second side wall. A first block and a second block are respectively arranged at two ends of the L-shape lamp shade. The first block is inserted into the third slot, and the second block is inserted into the fourth slot.

Further, the housing also includes a top wall and a third side wall. The third side wall is arranged parallel to the second side wall. One side of the top wall is connected to the top side of the third side wall, and other side of the top wall is connected to the top side of the second side wall. The top wall, the second side wall and the third side wall enclose to form a second placement cavity which is provided with a circuit board and a power supply unit. The power supply unit is electrically connected to the circuit board, and the circuit board is electrically connected to the luminous unit.

Further, a switch and a pulse width modulation rotary switch are arranged on the circuit board. The switch and the pulse width modulation rotary switch extend to the outside of the housing respectively.

Further, the interior of the housing is provided with a passive infrared sensor control board which is electrically connected to the luminous unit. The top side of the passive infrared sensor control board is provided with a passive infrared sensor which extends to the outside of the housing. The passive infrared sensor control board is electrically connected to the circuit board.

Further, plugs are arranged at two ends of the housing. The plugs are provided with wire connecting terminals.

The beneficial effects of the present invention:

The present invention provides a cabinet light with diffuser and reflector behind L-shaped lamp shade, which can effectively conduct light through an L-shape lamp shade, maximize the luminous effect of light, and make the two surfaces of the L-shape lamp shade emit light evenly; and the prismatic effect on the surface of the lamp shade can effectively prevent the product from causing harm to human eyes, and can also increase the luminous area of the product, so that the lighting angle is larger, so as to meet the users' needs.

DESCRIPTION OF MARKS IN FIGURES

Figure 1:
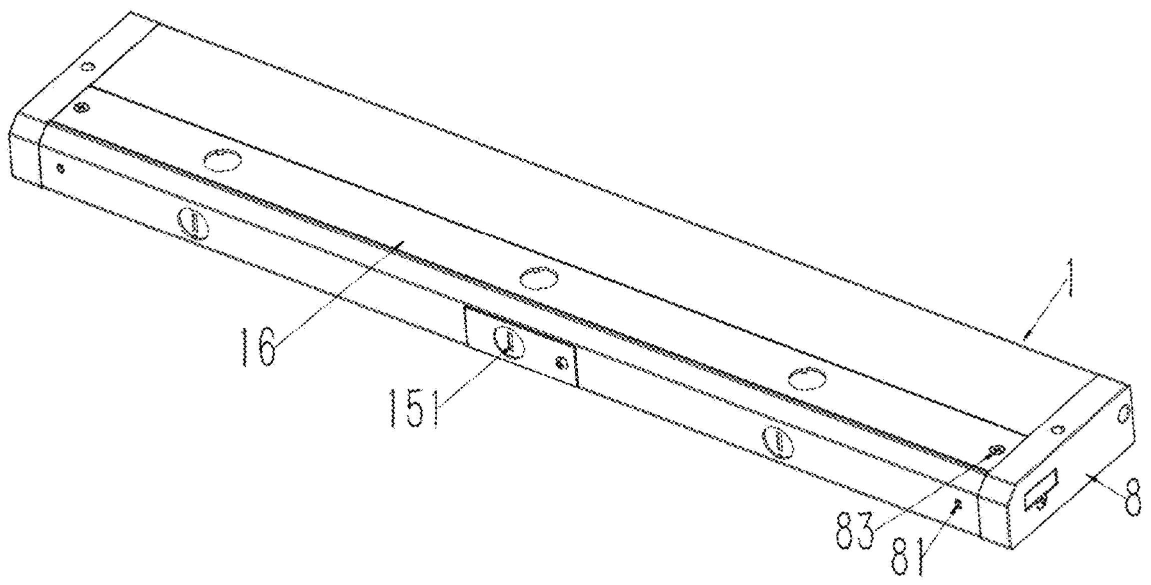
FIG. 1 is a schematic diagram of a cabinet light with diffuser and reflector behind L-shaped lamp shade of the present invention.

1—housing; 11—first bottom wall; 111—first slot; 12—first side wall; 121—second slot; 122—third slot; 13—second side wall; 131—step; 132—fourth slot; 14—top wall; 15—third side wall; 151—outgoing wire line support; 152—buckle hole; 16—second bottom wall; 162—second placement hole; 17—first placement cavity; 18—second placement cavity;

2—circuit board; 21—power supply unit; 22—switch; 23—pulse width modulation rotary switch; 24—second switch; 25—passive infrared sensor control board; 251—passive infrared sensor;

3—luminous unit; 31—luminous part;

4—lamp shade; 41—prismatic crystal; 42—first block; 43—second block;

5—diffusion plate; 6—reflection plate; 7—light refraction region;

8—plug; 81—first buckle; 82—first placement hole; 83—screw; 84—terminal fixing plate; 85—wire connecting terminal; 86—second buckle; 87—limit protrusion; 88—cover plate.

DETAILED DESCRIPTION OF THE EMBODIMENTS

Below is a further detailed description of the present invention based on the figures.

The present embodiment only shows an explanation of the present invention and it is not a limitation to the present invention. The skilled in the art can make modifications to this embodiment as needed without making any creative contributions after reading this specification, which are always protected by the patent law as long as they are within the scope of the claims of the present invention.

It should be noted that when an element is called as being "fixed to" or "arranged on" another element, it can be directly on the other element or indirectly on the other element. When an element is called as being "connected to" another element, it can be directly connected to the other element or indirectly connected to the other element.

It should be noticed that the terms "length", "width", "above", "below", "front", "rear", "left", "right", "vertical", "horizontal", "top", "bottom", "inside" and "outside" which indicates the orientations or positional relationships are based on the orientations or positional relationships shown in the figures. They are only for facilitating describing the present invention and simplifying the description, rather than indicating or implying that the device or component must have a specific orientation, construct and operate in a specific orientation, therefore, it understood as a limitation of the present invention.

In addition, the terms "first" and "second" are used for descriptive purposes only and cannot be understood as indicating or implying relative importance or implicitly indicating the quantity of indicated technical features. Therefore, a feature defined as "first" and "second" may explicitly or implicitly include one or more of these features. In the description of the present invention, "a plurality of" means two or more, unless otherwise specifically defined.

The present invention provides a cabinet light with diffuser and reflector behind L-shaped lamp shade having improved illumination uniformity and light conversion efficiency through an L-shape lamp shade. Besides, by setting prismatic crystals on the surface of the lamp shade to make the light effect soft and even to protect users' eyes.

Figure 2:
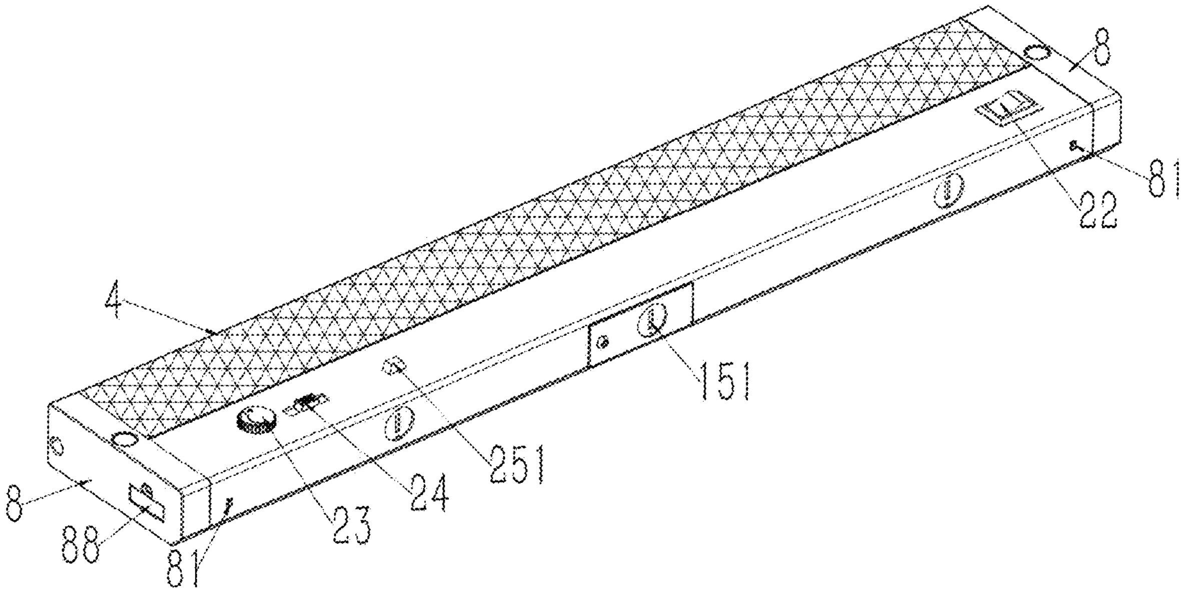
FIG. 2 is a schematic diagram of the cabinet light with diffuser and reflector behind L-shaped lamp shade of the present invention from another angle.
Figure 3:
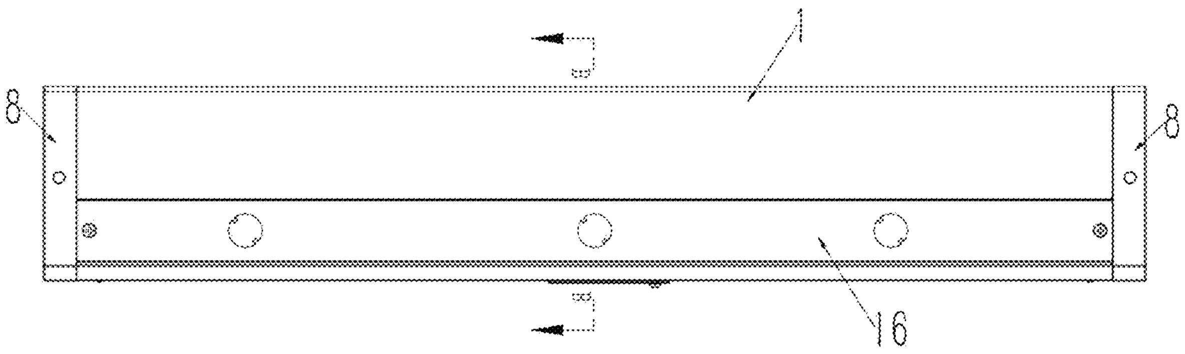
FIG. 3 is a top view of the cabinet light with diffuser and reflector behind L-shaped lamp shade of the present invention.
Figure 4:
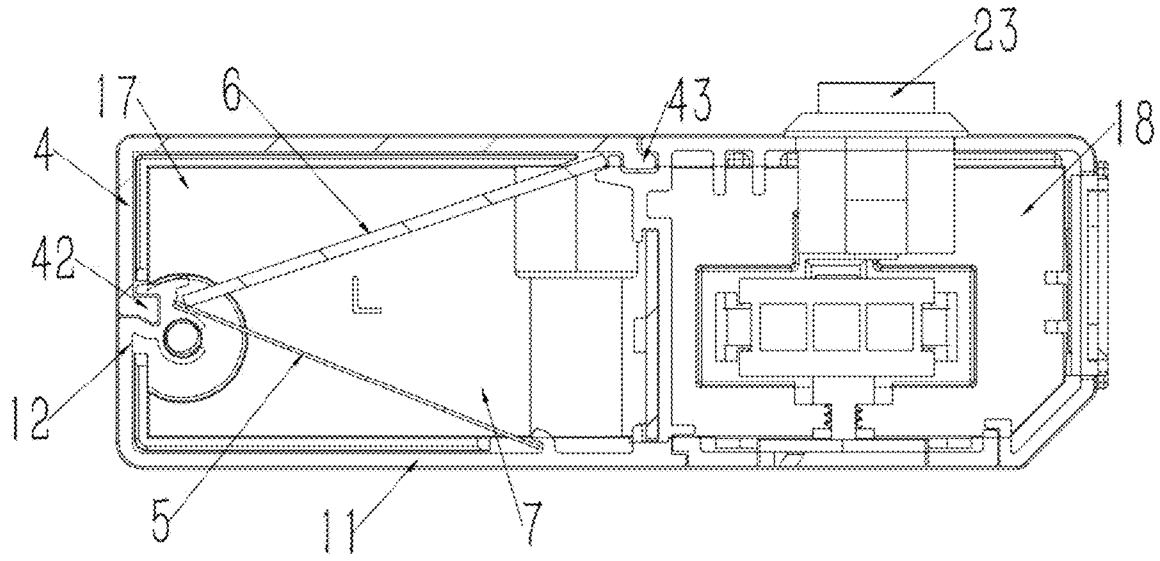
FIG. 4 is a cross-sectional view along the line B-B in FIG. 3.
Figure 5:
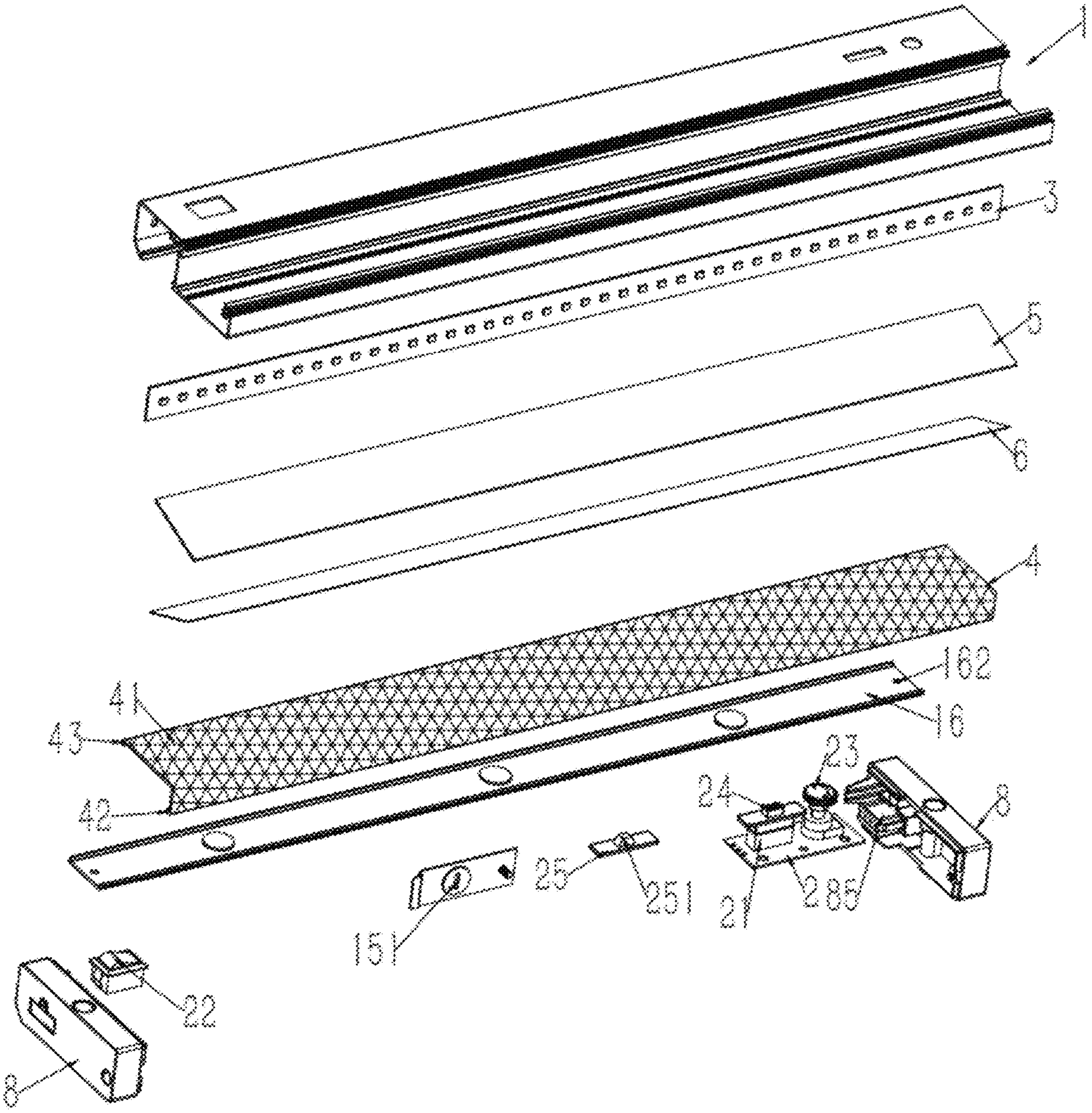
FIG. 5 is an exploded view of the cabinet light with diffuser and reflector behind L-shaped lamp shade of the present invention.
Figure 6:
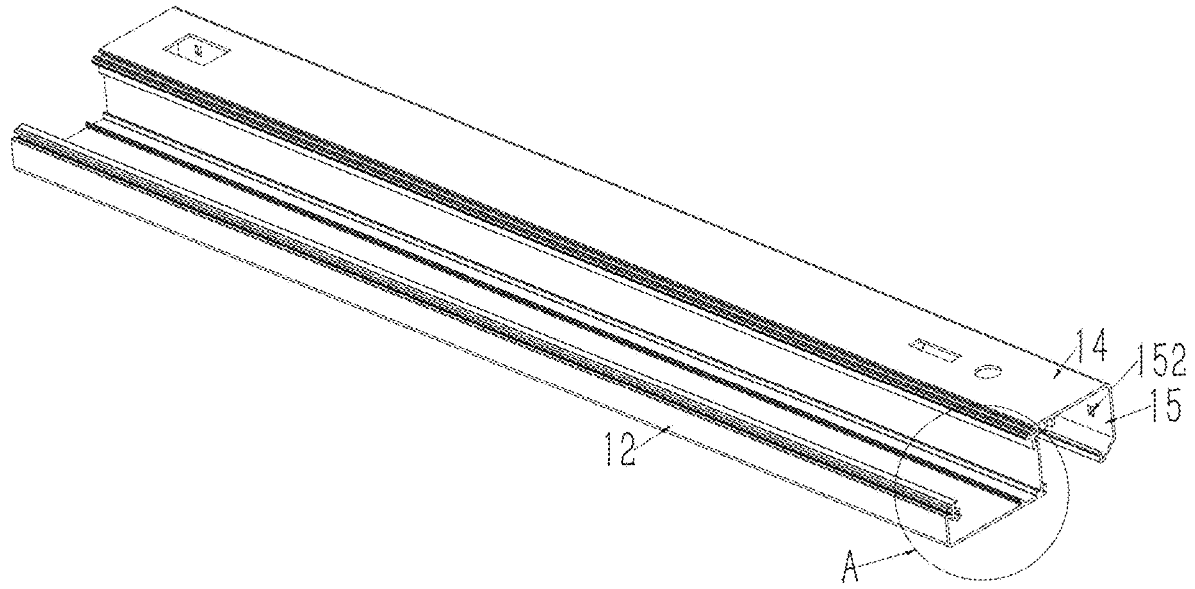
FIG. 6 is a schematic diagram of a housing of the cabinet light with diffuser and reflector behind L-shaped lamp shade of the present invention.
Figure 7:
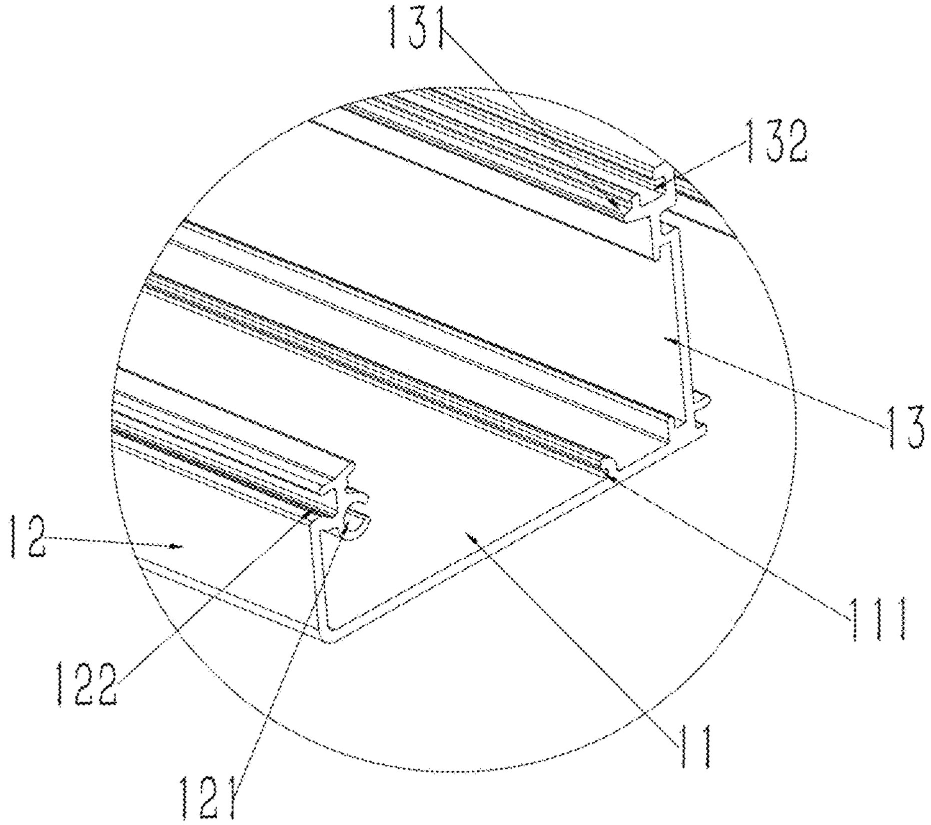
FIG. 7 is an enlarged schematic diagram of point A in FIG. 6.
Figure 8:
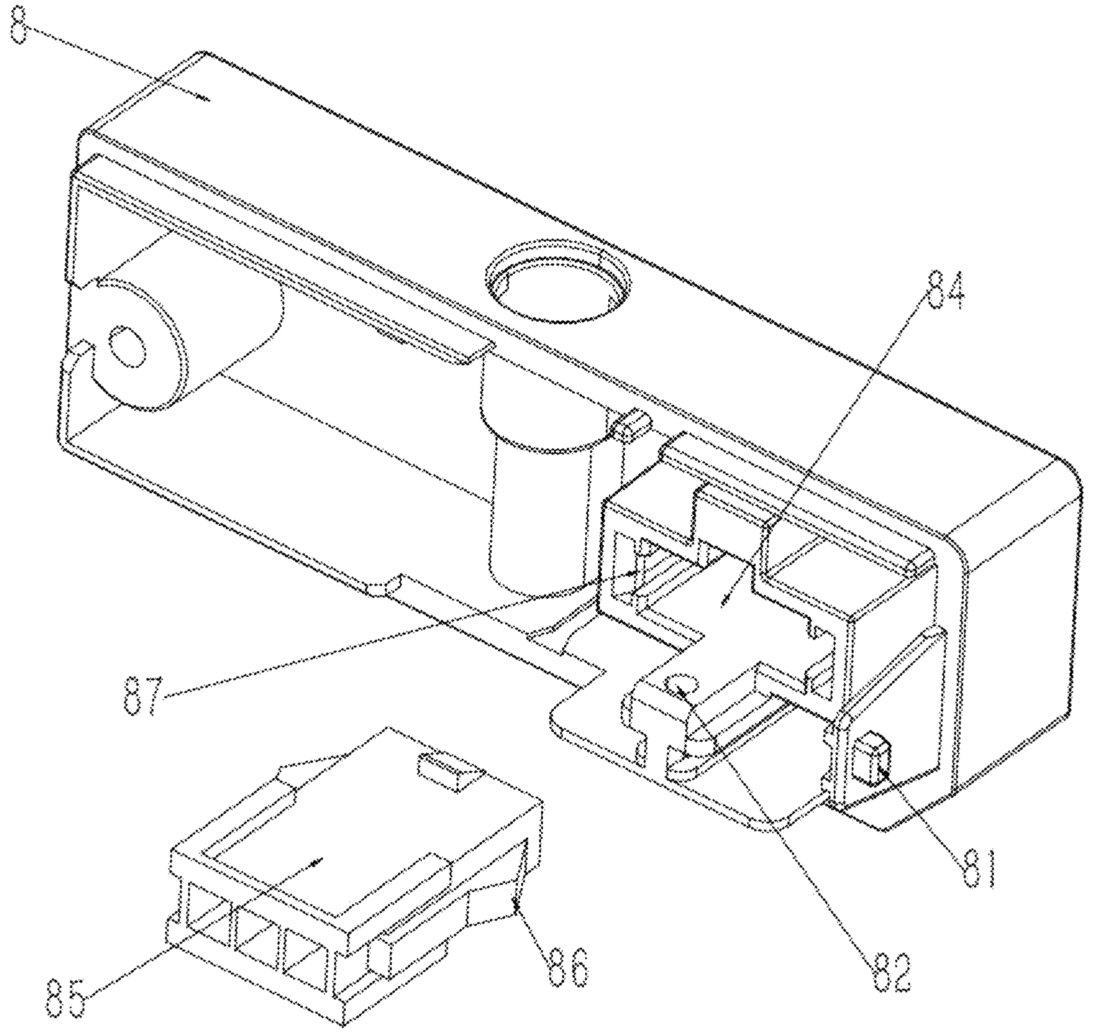
FIG. 8 is an exploded view of the plug and the wire connecting terminal in the cabinet light with diffuser and reflector behind L-shaped lamp shade of the present invention.

Referring to FIGS. 1-8, the present embodiment provides a cabinet light with diffuser and reflector behind L-shaped lamp shade, including a housing 1, a luminous unit 31 arranged inside the housing 1, and a lamp shade 4 connected to the housing 1. The lamp shade 4 is configured as an L-shape structure. Luminous portions of the luminous unit 3 are arranged toward an inner side surface of the lamp shade 4. A diffusion plate 5 and a reflection plate 6 are arranged between the lamp shade 4 and the luminous unit 3.

Among them, the diffusion plate 5 is obliquely arranged on the upper side of the luminous unit 3, and the reflection plate 6 is obliquely arranged on the lower side of the luminous unit 3. One end of the diffusion plate 5 away from the luminous unit 3 is overlapped on the reflection plate 6. The diffusion plate 5 and the reflection plate 6 enclose to form a light refraction region 7.

By providing the reflection plate 6, the light emitted from the luminous unit 3 to the lower side can be reflected onto the diffusion plate 5. The diffusion plate 5 can collect the light emitted from the luminous unit 3 to the upper side and the light reflected by the reflection plate 6, and diffuse the light to the lamp shade 4, so that the light is evenly distributed on the surface of the lamp shade 4. Finally, the light is conducted to the external environment through the lamp shade 4, so as to fully utilize the light emitted by the luminous unit 3. In addition, the reflection plate 6 can also play a role of heat insulation and protection, reducing the heat impact of the light on the surrounding environment.

The L-shape lamp shade 4 has two luminous surfaces. Combined with the reflection plate 6 and the diffusion plate 5, the two luminous surfaces of the L-shape lamp shade 4 can emit light evenly. At the same time, the L-shape lamp shade 4 can also better increase the texture and beauty of the cabinet light.

Preferably, the outer surface of the lamp shade 4 has a plurality of convex prismatic elements 41. It should be noted that the convex prismatic elements 41 can be integrally formed with the lamp shade 4, or the convex prismatic elements 41 can be arranged on the outer surface of the lamp shade 4 through an additional connection process.

The convex prismatic elements 41 located on the outer surface of the lamp shade 4 has a prismatic effect, which can effectively prevent the light from causing harm to human eyes, and can also increase the luminous area, so that the lighting angle of the cabinet light provided in this embodiment is larger, providing users with better lighting effects.

Preferably, the housing 1 includes a first bottom wall 11, and a first side wall 12 and a second side wall 13 extending upward from two sides of the first bottom wall 11. The first bottom wall 11, the first side wall 12, and the second side wall 13 enclose to form a first placement cavity 17. A first slot 111 is arranged on the first bottom wall 11, and a second slot 121 is arranged on the first side wall 12. The two ends of the reflection plate 6 are respectively inserted into the first slot 111 and the second slot 121. The top side of the second side wall 13 is provided with a step 131. One end of the diffusion plate 5 is overlapped on the end of the reflection plate 6 near one end of the second slot 121, and other end of the diffusion plate 5 is overlapped on the step 131.

A third slot 122 is arranged on the side of the first side wall 12 away from the second slot 121, a fourth slot 132 is arranged on the top side of the second side wall 13. A first block 42 and a second block 43 are respectively arranged at two ends of the L-shape lamp shade 4. The first block 42 is inserted into the third slot 122, and the second block 43 is inserted into the fourth slot 132.

The second side wall 13 is provided with a placement groove, which is provided with the luminous unit.

Preferably, the housing 1 also includes a top wall 14 and a third side wall 15. The third side wall 15 is arranged in parallel with the second side wall 13. One side of the top wall 14 is connected to the top side of the third side wall 15, and other side of the top wall 14 is connected to the top side of the second side wall 13. The top wall 14, the second side wall 13 and the third side wall 15 enclose to form a second placement cavity 18. A circuit board 2 and a power supply unit 21 are arranged in the second placement cavity 18. The power supply unit 21 is electrically connected to the circuit board 2 which is electrically connected to the luminous unit 3. The power supply unit 21 provide an operation voltage for the circuit board 2 which controls the opening and closing of the luminous unit 3.

The housing 1 also includes a second bottom wall 16 which is used to close and open the second placement cavity 18, so as to facilitate users to repair and replace the circuit board 2 and the power supply unit 21.

Preferably, a switch 22 and a pulse width modulation rotary switch 23 are arranged on the circuit board 2. The switch 22 and the pulse width modulation rotary switch 23 are respectively extended to the outside of the housing 1 to facilitate users' operation.

In this embodiment, the circuit board 2 is installed to improve the extra power consumption caused by the unbalanced load in the lighting circuit, improve the power factor, reduce the operation temperature of the cabinet light and the circuit, and achieve the purpose of optimizing the power supply, thereby extending the service life of the luminous unit 3. The switch 22 controls the opening and closing of the luminous unit 3, and the pulse width modulation rotary switch 23 adjust the light and the color of the luminous unit 3, which can meet the different usage needs of different customers.

Further, a second switch 24 is arranged on the housing 1, and the second switch 24 is electrically connected to the luminous unit 3 which includes a plurality of LED lamp beads. In some environments where the lighting effect is not required to be high, some LED lamp beads can be turned off by the second switch 24 to reduce energy consumption.

Preferably, plugs 8 are arranged at two ends of the housing 1, and the plugs 8 are used to seal the two ends of the housing 1.

First buckles 81 are arranged on two sides of the plugs 8. Buckle holes 152 are arranged on the third side wall 15 of the housing 1. The first buckles 81 are matched with the buckle holes 152 to achieve a preliminary connection of the plug 8 and the housing 1.

Further, a first placement hole 82 is arranged at the bottom of the plug 8, and a second placement hole 162 is arranged at the second bottom wall 16. The first placement hole 82 and the second placement hole 162 are connected by screws 83 to achieve secondary fixation of the plug 8 and the housing 1.

Preferably, the plug 8 is provided with a wire connecting terminal 85 which is used to connect the power supply unit 21 with an external power supply device.

Second buckles 86 are arranged at two sides of the wire connecting terminal 85. A terminal fixing plate 84 is arranged on the plug 8, and a limit protrusion 87 is arranged on the side wall of the terminal fixing plate 84. The second buckles 86 cooperate with the limit protrusion 87 to fix the wire connecting terminal 85 on the terminal fixing plate 84.

Further, the terminal fixing plate 84 is provided with a cover plate 88 which is used to housing or open the wire connecting terminal 85.

Preferably, the third side wall 15 of the housing 1 is provided with an outgoing wire line support 151 which allows external cables to pass through and enter the housing 1 to supply power to the luminous unit 3 inside the housing 1.

Preferably, the housing 1 is also provided with a passive infrared sensor control board 25 which is electrically connected to the luminous unit 3. The top side of the passive infrared sensor control board 25 is provided with a passive infrared sensor 251 which extends to the outside of the housing 1. The passive infrared sensor control board 25 is electrically connected to the circuit board.

Understandably, the infrared radiation of the surrounding environment can be detected by the passive infrared sensor 251. When the human body or other objects with higher temperatures move, infrared radiation will be generated and will be detected by the passive infrared sensor 251. When the passive infrared sensor 251 detects infrared radiation, the passive infrared sensor control board 25 detects the signal sent by the passive infrared sensor 251, and the passive infrared sensor 25 triggers the circuit board 2, thereby automatically controlling the luminous unit 3. The passive infrared sensor 251 is very sensitive and can detect slight changes in human movement. The sensitivity can also be adjusted by adjusting parameters to adapt to different environments. At the same time, by setting the passive infrared sensor 251 as a slope, the range accepted by the passive infrared sensor 251 can be increased, so that the sensing angle distance can be increased.

It could be understood that under the guidance of the above embodiments, those skilled in the filed can combine various implementation methods in the above embodiments to obtain technical solutions of multiple implementation methods.

The above description is only a preferred embodiment of the present invention and is not to limit the present invention. Any modifications, equivalent substitutions and improvements made within the spirit and principles of the present invention should be included in the protection scope of the present invention.

The invention claimed is:

1. A cabinet light with diffuser and reflector behind L-shaped lamp shade, comprises:

a housing;

a lamp shade connected to the housing, the lamp shade configured as an L-shaped structure;

a luminous unit arranged inside the housing, and having a plurality of luminous portions arranged to project light towards the inner surface of the lamp shade;

a diffusion plate; and a reflection plate, wherein the diffusion and the reflection plates are arranged between the lamp shade and the luminous unit.

2. The cabinet light with diffuser and reflector behind L-shaped lamp shade according to claim 1, wherein:

the diffusion plate is obliquely arranged on an upper side of the luminous unit, and the reflection plate is obliquely arranged on a lower side of the luminous unit;

one end of the diffusion plate away from the luminous unit is overlapped on the reflection plate; and the space between the diffusion plate and the reflection plate enclose to define a light refraction region.

3. The cabinet light with diffuser and reflector behind L-shaped lamp shade according to claim 1, further comprising a plurality of convex prismatic elements provided on an outer surface of the lamp shade.

4. The cabinet light with diffuser and reflector behind L-shaped lamp shade according to claim 1, further comprising plugs are arranged at two ends of the housing and wire connecting terminals provided in the plugs.

5. The cabinet light with diffuser and reflector behind L-shaped lamp shade according to claim 1, wherein the housing comprises;

a first bottom wall; and a first side wall and a second side wall extending upward from two sides of the first bottom wall, wherein the first bottom wall, the first side wall and the second side wall cooperate to form a first placement cavity, and the reflection plate and the diffusion plate are arranged in the first placement cavity.

6. The cabinet light with diffuser and reflector behind L-shaped lamp shade according to claim 5, further comprising:

a first slot arranged on the first bottom wall;

a second slot arranged on the first side wall;

a step arranged on a top side of the second side wall, wherein two ends of the reflection plate are respectively inserted into the first slot and the second slot, and one end of the diffusion plate is overlapped on one end of the reflection plate close the second slot, and other end of the diffusion plate is overlapped on the step.

7. The cabinet light with diffuser and reflector behind L-shaped lamp shade according to claim 5, further comprising:

a third slot arranged on a side of the first side wall away from the second slot, a fourth slot arranged on the top side of the second side wall;

a first block and a second block are respectively arranged at two ends of the lamp shade, wherein the first block is inserted into the third slot, and the second block is inserted into the fourth slot.

8. The cabinet light with diffuser and reflector behind L-shaped lamp shade according to claim 5, further comprising:

a power supply unit:

a circuit board electrically connected to the power supply unit and the luminous unit, the housing further comprises:

a top wall; and a third side wall arranged parallel to the second side wall, wherein one side of the top wall is connected to the top side of the third side wall, and other side of the top wall is connected to a top side of the second side wall; the top wall, the second side wall and the third side wall cooperate to form a second placement cavity in which the circuit board and the power supply unit are provided.

9. The cabinet light with diffuser and reflector behind L-shaped lamp shade according to claim 8, further comprising:

a switch; and a pulse width modulation rotary switch, wherein the switch and the pulse modulation rotary switch are arranged on the circuit board, such that the switch and the pulse width modulation rotary switch extend to an outside of the housing.

10. The cabinet light with diffuser and reflector behind L-shaped lamp shade according to claim 8, further comprising:

a passive infrared sensor control board electrically connected to the luminous unit and the circuit board; and a passive infrared sensor provided on a top side of the passive infrared sensor control board and configured to extends to the outside of the housing.

* * * * *